Oct. 25, 1949.  J. D. GWYN  2,486,153
METHOD OF BENDING A PLURALITY OF GLASS
SHEETS SIMULTANEOUSLY
Filed April 6, 1945
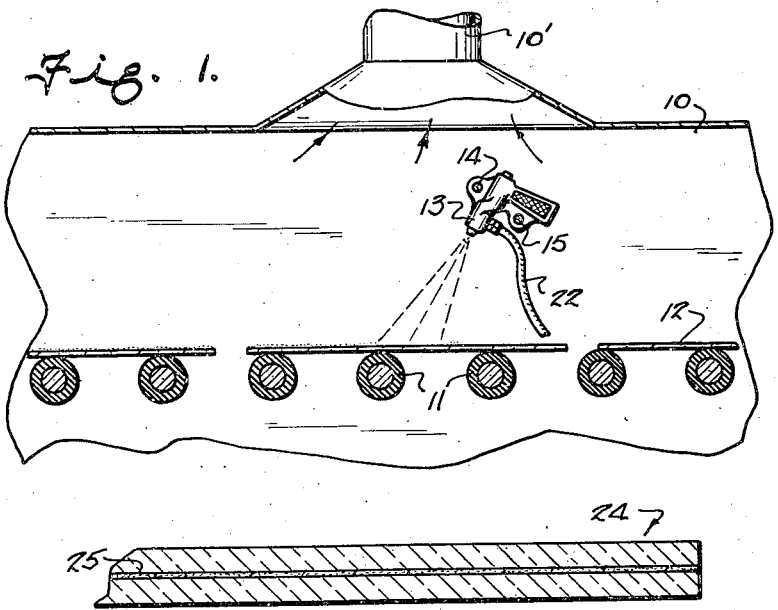
Fig. 1.
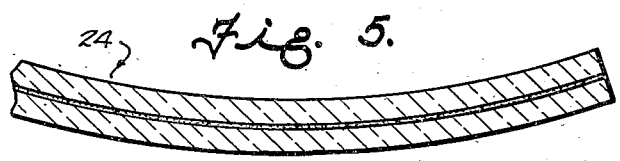
Fig. 3.
Fig. 5.
Fig. 2.
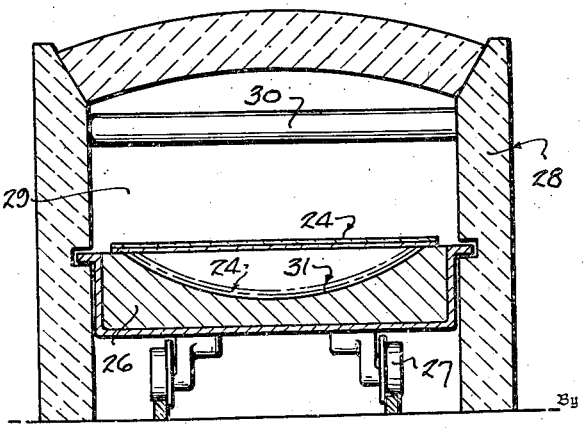
Fig. 4.
Inventor
JAMES D. GWYN.
Frank Fraser
Attorney Patented Oct. 25, 1949

2,486,153

UNITED STATES PATENT OFFICE 2,486,153

METHOD OF BENDING A PLURALITY OF GLASS SHEETS SIMULTANEOUSLY

James D. Gwyn, Toledo, Ohio, assignor to Libbey-Owens-Ford Glass Company, Toledo, Ohio, a corporation of Ohio Application April 6, 1945, Serial No. 586,856

11 Claims. (Cl. 49—84)

This invention relates to the bending of glass sheets. More particularly it has to do with the bending of a plurality of glass sheets at the same time; with a method of protecting the contacting surfaces of adjacent sheets during this multiple bending operation; and with a special coating composition to be used in practicing the method.

In the production of bent laminated safety glass of the type that is made up of two sheets of glass and an interposed layer of thermoplastic, for example, it is desirable to bend the glass sheets that go into the composite unit, in pairs, so as to insure their having exactly matching contours. In order to do this without the sheets adhering to one another during bending, it is customary to coat the contacting surface of one or both of the glass sheets with a relatively thin layer of a so-called "parting material."

In addition to preventing the glass sheets from "sticking," this parting material must also be of such character that it will not itself injure the glass surfaces under bending conditions, and only a comparatively few materials appear to be suitable for the purpose. Heretofore the only ones that have proved at all satisfactory in commercial use have been calcium carbonate or whiting, diatomaceous earth, and a finely divided silica material that is known to the trade as "Varcel."

The trouble with these known materials lies principally in the difficulty of washing them off the glass sheets after the bending operation. All of them are water insoluble and adhere tenaciously to the glass after bending. As a consequence, they must either be cleaned off with Bon Ami or the glass must be scrubbed with a detergent to remove them and, since washing machines that employ mechanical scrubbing or rubbing members do not handle bent glass satisfactorily, the washing of the parting material from the bent sheets has, up until now, had to be done by hand.

As a matter of fact this necessity for the hand washing of the parting material from the glass sheets, in addition to being expensive and time-consuming, has been one of the principal bottle-necks in the rapidly growing bent laminated safety glass industry.

It is an aim of this invention to protect the contacting surfaces of adjacent glass sheets during bending, by the application to such surfaces of a water-soluble parting material that will remain solid and inert to glass at the bending temperatures, and that can be readily and completely removed after bending by simply rinsing or flushing the sheets with water to dissolve and carry away the parting material.

Another object is the provision of a novel way of applying the water-soluble parting material to the glass surfaces so as to obtain a uniform and non-crystalline deposit.

Still another object is to provide a special combination of the parting material with a vehicle in which it can be sprayed or otherwise applied to the glass, and which combination consists essentially of a suspension of the material in an anhydrous medium.

Other objects and advantages of the invention will become more apparent during the course of the following description, when taken in connection with the accompanying drawings.

In the drawings, wherein like numerals are employed to designate like parts throughout the same:

Fig. 1 is a fragmentary, vertical sectional view through a spray booth, showing a device for spraying the parting material onto the glass sheets;

Fig. 2 is a view of a tank or container from which the suspension of the parting material is supplied to the spray device of Fig. 1;

Fig. 3 is a sectional view through a pair of superimposed glass sheets with a layer of the parting material between them;

Fig. 4 is a sectional view through one type of furnace within which the assembled glass sheets of Fig. 3 may be bent; and Fig. 5 is a sectional view through the sheets of Fig. 3 after they have been bent to the desired contour.

As pointed out above, the present invention revolves around the idea of using a water-soluble material, such as a water-soluble salt, as the parting material between the glass sheets in bending a plurality of such sheets simultaneously. Now not all water-soluble materials are suitable for this purpose. In fact, most of them decompose at temperatures high enough to bend glass which, roughly speaking, run from 1100 to 1250 degrees Fahrenheit. Others attack the surface of the hot glass, ruining the finish, while still others will melt and fuse the glass sheets together.

However, it has been found that certain water-soluble materials, and particularly water-soluble salts such as sodium sulphate, potassium sulphate and sodium bicarbonate are sufficiently stable, solid and inert to glass at the bending temperatures to be satisfactory for use as parting materials.

Sodium bicarbonate does undergo some decomposition within or even below the temperature range of 1100 to 1250 degrees Fahrenheit, but in actual practice the decomposition does not proceed to a point, during the bending operation, that will effect its efficiency as a parting material. Nor does it go far enough to give rise to sodium carbonate which itself will stain the glass under bending conditions.

It now appears that any water-soluble material that will not melt, attack the surface of the glass, or decompose to an extent sufficient to give rise to water-insoluble materials, at bending temperatures will answer the purpose. However, to date, sodium sulfate has proved to be the most satisfactory of the water soluble materials that have been tried.

One of the principal advantages of using parting materials of this particular character in bending glass is, of course, the fact that they are water-soluble, which permits them to be readily rinsed or flushed off the surface of the glass with water. In view of this, it was logical to assume that the best way to coat a surface with a layer of this sort of material would be to dissolve it in water and to spray the solution onto the glass sheet.

However, I have discovered that surprisingly better results can be obtained by going contrary to what would naturally appear to be the best procedure and depositing the water-soluble material onto the glass, not from a water solution, but from a suspension of the material; and particularly from a suspension from which water has been purposely eliminated. Or, in other words, from an anhydrous suspension.

For one thing, when, as is preferred, a low boiling point and low vapor pressure anhydrous liquid is used as the suspending medium, the suspension of water-soluble salt will dry practically instantaneously when sprayed on the glass at room temperature. For another thing, sufficient salt can be readily deposited on the surface in an even, uniform coating. And finally, when deposited from a substantially anhydrous suspension, the possibility of the salt crystallizing on the glass sheet to cause pits and other surface markings during the bending operation is completely overcome.

In fact, in actual commercial production over a period of several months, the use of the water-soluble parting material applied as described in this application, has given consistently better surface quality in the bent glass sheets than had ever been obtained with any of the parting materials formerly used.

Referring back to the drawings for a more detailed explanation of the invention, there is illustrated in Fig. 1 a suitable booth or chamber 10 in which the parting material can be sprayed on the glass sheets. Prior to the spray operation the glass sheets to be bent are thoroughly washed and dried, after which they are placed on the rolls 11, as indicated at 12, and passed into and through the spray booth. Mounted above the path of travel of the glass sheets is a spray gun 13 which is designed to spray a coating of the parting material on the glass sheets as they pass thereunder.

The spraying of the sheets can be done by hand if desired but, because of the possibility of objectionable fumes from the volatile vehicle in which the parting material is preferably suspended, it is preferred to do the spraying mechanically in a closed booth. One satisfactory way in which this can be done is to mount the gun 13 for sliding movement on rods 14 and 15 and to then move the gun continuously back and forth across the moving sheet, either manually from outside the cabinet, or by means of a suitable reciprocating mechanism. All fumes are withdrawn and a slightly sub-atmospheric pressure can be maintained within the spray booth by a suitable air exhausting device connected to the stack 10'.

The supply of spray material is preferably contained in a closed vessel, or tank, such as is shown at 16 in Fig. 2. Any of the water-soluble materials discussed above can be used in making up the spray, the water-soluble material in finely divided form being suspended in a suitable anhydrous liquid. Practically any organic anhydrous liquid having a low boiling point and high vapor pressure, that will not react with the water-soluble material or leave a residue on the glass will be satisfactory. For example, anhydrous ketones like acetone, esters such as ethyl acetal and chlorinated aliphatic compounds like ethylene dichloride can all be used. From a practical standpoint, however, alcohols are preferred because of their cheapness and methanol and ethanol are good examples of desirable ones.

By way of illustration, one combination or suspension that has given unusually satisfactory results in actual commercial production is prepared as follows:

Six pounds of anhydrous sodium sulfate is ground in four pounds of anhydrous methanol, and this suspension of sodium sulfate in methanol is then classified by passing it through a 325 mesh screen. The resulting screened suspension is next diluted further with 23 pounds of anhydrous methanol, whereupon it is placed in the container 16 and is ready to be sprayed on the glass.

These proportions of materials may be varied depending upon the drying time, thickness of coating, and similar results desired. Also the water-soluble salt may be used in a more finely divided state, but it is preferred to have it no coarser than will pass through a 300 mesh screen.

Because the salts employed tend to drop out of suspension quite readily, it is desirable to provide an agitator to operate within the material in the tank 16. For this purpose a paddle wheel type stirrer 17 may be mounted, adjacent the bottom of the tank, on the end of a shaft 18 that is connected with a motor 19, carried by the cover 20 of the tank, or with any other suitable driving means. The tank 16 is also provided with an outlet or feed pipe 21 connected to a flexible hose 22 leading to the spray gun 13 in the spray booth. Once a supply of the suspension material has been placed in the tank 16, the agitator 17 should be kept in continuous operation, and the suspension can be fed to the spray gun at the desired pressure by compressed air forced into the top of the tank through a pipe 23.

The glass sheets 12 to be bent are preferably fed in pairs through the booth 10, and either one or both of the sheets can be sprayed as desired. As the sheets to be sprayed pass beneath the spray gun 13, the movement of the gun across the sheet will be so controlled, with relation to the forward movement of the sheet, as to apply a relatively thin, even coating over the entire top surface. The drying of the coating is a matter of seconds, as a result of which the sheets may be assembled in pairs or stacked together by the operator as soon as they emerge from the booth. Furthermore, no preliminary heating of the glass, or forced air drying of the sprayed coating is necessary. Instead, the entire coating procedure can be carried out at room temperature and under normal conditions.

After spraying, and in cases where the glass sheets are to be bent in pairs rather than in larger groups, the two sheets of each pair are placed together as shown at 24 in Fig. 3, with the coating of parting material on one or both of their surfaces forming a layer 25 therebetween. The next step is to bend the assembled sheets, and this may be done in a continuous furnace of the type shown in Fig. 4.

With this particular set-up the pair of sheets 24 to be bent are placed on a suitable mold 26 that is mounted on wheels 27 for movement longitudinally through the furnace 28. The furnace tunnel or chamber 29 is provided with overhead electrical resistance units 30 which act to gradually heat the glass sheets to a point where they will sink of their own weight down into conformation with the bending surface 31 of the mold 26, as indicated in broken lines. In order to facilitate the bending action it may be desirable to apply suction to the bottom of the mold cavity, once the sheets have softened to the bending point, but this is purely a matter of bending procedure.

After proper cooling, the glass sheets leave the bending furnace 28 and are removed from the mold. At this time they are shaped as shown in Fig. 5 and it is then only necessary to separate them, and flush off the parting material, in order to have them in condition for laminating.

As pointed out above, the water-soluble salt of this invention can be readily washed or rinsed from the sheet. Preferably this is done by passing the sheets through a washing machine of the type disclosed in the copending application of Emmett L. Walters, Serial No. 588,820, filed April 17, 1945. This machine employs no mechanical scrubbing apparatus at all, but simply sprays water at high velocity against the sheets moving through the machine. Usually this is all that is necessary, although in cases where there is dirt or grease in addition to the parting material on the glass, it may be desirable to mix a cleaning material with the water.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. In a method of bending a plurality of glass sheets simultaneously, the step of applying a layer of parting material to a surface of at least one of said sheets prior to bending by coating said surface from an anhydrous suspension of a water-soluble material that remains water-soluble solid and inert to glass at the bending temperatures of glass.

2. In a method of bending a plurality of glass sheets simultaneously, the step of applying a layer of parting material to a surface of at least one of said sheets prior to bending by coating said surface with a suspension of a water-soluble material that remains water-soluble solid and inert to glass at glass bending temperatures, in a low boiling point high vapor pressure anhydrous medium that is inert to said water-soluble material and evaporates without leaving a residue.

3. In a method of bending a plurality of glass sheets simultaneously, the step of applying a layer of parting material to a surface of at least one of said sheets prior to bending by coating said surface with a suspension of an anhydrous water-soluble salt that remains water-soluble solid and inert to glass at glass bending temperatures, in a low boiling point high vapor pressure organic anhydrous liquid that is inert to said water-soluble material and evaporates without leaving a residue.

4. In a method of bending a plurality of glass sheets simultaneously, the step of applying a layer of parting material to a surface of at least one of said sheets prior to bending by coating said surface with a suspension of a water-soluble material that remains water-soluble solid and inert to glass substances at glass bending temperatures, in a low boiling point high vapor pressure alcohol.

5. In a method of bending a plurality of glass sheets simultaneously, the step of applying a layer of parting material to a surface of at least one of said sheets prior to bending by coating said surface with an anhydrous suspension of a water-soluble material that remains water-soluble solid and inert to glass at the bending temperatures of glass, and is of sufficient fineness to pass through a 300 mesh screen.

6. In a method of bending a plurality of glass sheets simultaneously, the step of applying a layer of parting material to a surface of at least one of said sheets prior to bending by coating said surface with an anhydrous suspension of sodium sulfate.

7. In a method of bending a plurality of glass sheets simultaneously, the step of applying a layer of parting material to a surface of at least one of said sheets prior to bending by coating said surface with an anhydrous suspension of sodium bicarbonate.

8. In a method of bending a plurality of glass sheets simultaneously, the step of applying a layer of parting material to a surface of at least one of said sheets prior to bending by coating said surface with an anhydrous suspension of potassium sulfate.

9. In a method of bending a plurality of glass sheets simultaneously, the step of applying a layer of parting material to a surface of at least one of said sheets prior to bending which comprises grinding a water-soluble material that remains water-soluble solid and inert to glass at glass bending temperatures in a low boiling point high vapor pressure anhydrous liquid that is inert to said water-soluble material and evaporates without leaving a residue to produce a suspension of finely divided water-soluble material, and then spraying this suspension onto a surface of one of said glass sheets.

10. In a method of bending a plurality of glass sheets simultaneously, the step of applying a layer of parting material to a surface of at least one of said sheets prior to bending which comprises grinding anhydrous sodium sulfate in a low boiling point alcohol to produce a suspension, classifying said suspension by passing it through a 325 mesh screen, diluting the classified suspension with an additional amount of the alcohol, and then spraying the classified and diluted suspension onto one surface of one of said glass sheets.

11. In a method of bending a plurality of glass sheets simultaneously, the step of applying a layer of parting material to a surface of at least one of said sheets prior to bending by coating said surface from an anhydrous suspension of a water-soluble salt in which the acid radical contains sulphur and which salt remains water-soluble, solid and inert to glass at the bending temperatures of glass.

JAMES D. GWYN.

REFERENCES CITED

The following references are of record in the file of this patent:

UNITED STATES PATENTS

| Number | Name | Date |
|---|---|---|
| 1,328,833 | Hasburg | Jan. 27, 1920 |
| 2,079,051 | Sullivan, Jr. et al. | May 4, 1937 |
| 2,392,770 | Ryan et al. | Jan. 8, 1946 |

OTHER REFERENCES

"Lange's Handbook of Chemistry," 1934, Table of Physical Constants of Inorganic Compounds, pages 200 and 201, published by Handbook Publishers, Inc., Sandusky, Ohio. (Copy in any chemical library.)

"Practical Methods of Organic Chemistry," 1898, pages 45–49 Gattermann, The Macmillan Co., New York, N. Y. (Copy in Division 64.)

Certificate of Correction

Patent No. 2,486,153 October 25, 1949

JAMES D. GWYN

It is hereby certified that error appears in the printed specification of the above numbered patent requiring correction as follows:

Column 6, line 13, strike out "substances";

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*